(12) United States Patent
Thielke et al.

(10) Patent No.: US 8,417,570 B2
(45) Date of Patent: Apr. 9, 2013

(54) SYSTEM FOR AUTOMATED MEDIA DELIVERY TO MOBILE DEVICES AND MOBILE DEVICE LOCKSCREENS

(75) Inventors: Patrick Thielke, Houston, TX (US); Josh Cincinnati, Houston, TX (US)

(73) Assignee: 1Spire, Inc., Houston, TX (US)

( * ) Notice: Subject to any disclaimer, the term of this patent is extended or adjusted under 35 U.S.C. 154(b) by 0 days.

(21) Appl. No.: 13/440,565

(22) Filed: Apr. 5, 2012

(65) Prior Publication Data
US 2012/0259707 A1  Oct. 11, 2012

Related U.S. Application Data

(60) Provisional application No. 61/472,906, filed on Apr. 7, 2011.

(51) Int. Cl.
  *G06Q 30/00* (2012.01)
(52) U.S. Cl.
  USPC ...................................... 705/14.42; 705/14.43
(58) Field of Classification Search .................... 705/14, 705/14.42, 14.43
  See application file for complete search history.

(56) References Cited

U.S. PATENT DOCUMENTS

| 2007/0156534 | A1 | 7/2007 | Lerner et al. |
| 2009/0125934 | A1 | 5/2009 | Jones et al. |
| 2011/0093320 | A1* | 4/2011 | Blake et al. ................ 705/14.16 |

FOREIGN PATENT DOCUMENTS

| KR | 10-0640391 B1 | 10/2006 |
| KR | 2010-0053135 A | 5/2010 |

OTHER PUBLICATIONS

"Determinants of Brand Advertising Efficiency; Buschken, Joachim; Journal of Advertising; v36n3; pp. 51-73; Fall 2007".*
International Serach Report Issued in PCT/US2012/032351, mailed Oct. 30, 2012 (2 Pages).
Written Opinion of the International Searching Authority issued in PCT/US2012/032351, Dated Oct. 30, 2012 (4 Pages).

* cited by examiner

*Primary Examiner* — John Weiss
*Assistant Examiner* — Michael Stibley
(74) *Attorney, Agent, or Firm* — Osha • Liang LLP

(57) ABSTRACT

A method and system for automated media delivery to mobile devices and mobile device lockscreens. The method includes receiving a first media request associated with a first target device, obtaining a first user account associated with the first media request, wherein the first user account comprises first user category criteria; selecting a first user-submitted media item based on the first user category criteria, and sending, to the first target device, the first user-submitted media object, wherein the first user-submitted media object is presented on a lock screen of the first target device. The method further includes receiving a second media request associated with the first target device, selecting a first advertiser-submitted media object based on the first user category criteria, and sending, to the first target device, the first advertiser-submitted media object, wherein the first advertiser-submitted media object is presented on the lock screen of the first target device.

12 Claims, 13 Drawing Sheets

SYSTEM FOR AUTOMATED MEDIA DELIVERY TO MOBILE DEVICES AND MOBILE DEVICE LOCKSCREENS

CROSS-REFERENCE TO RELATED APPLICATIONS

Pursuant to 35 U.S.C. §119 (e), this application claims benefit of U.S. Provisional Application No. 61/472,906 filed on Apr. 7, 2011, entitled "TIME BASED SMART PHONE DISPLAY." The disclosure of this U.S. Provisional Application is incorporated herein by reference in its entirety.

BACKGROUND

Portable electronic devices, such as smart phones, tablets, portable computers, notebooks, and the like are a critical aspect of daily life. Many individuals use one or more of such electronic devices on a daily basis, thereby allowing the individuals constant access to information. As individuals have greater access to such personal electronic devices, there is an increasing need to provide updated content to the users.

SUMMARY

In general, in one aspect, the invention relates to a computer readable media including instructions that, when executed by a processor, perform a method for automated media delivery to mobile devices and mobile device lockscreens. The method includes receiving a first media request associated with a first target device, obtaining a first user account associated with the first media request, wherein the first user account comprises first user category criteria; selecting a first user-submitted media item based on the first user category criteria, and sending, to the first target device, the first user-submitted media object, wherein the first user-submitted media object is presented on a lock screen of the first target device. The method further includes receiving a second media request associated with the first target device, selecting a first advertiser-submitted media object based on the first user category criteria, and sending, to the first target device, the first advertiser-submitted media object, wherein the first advertiser-submitted media object is presented on the lock screen of the first target device.

Other aspects of the invention will be apparent from the following description and the appended claims.

DETAILED DESCRIPTION

Figure 1:
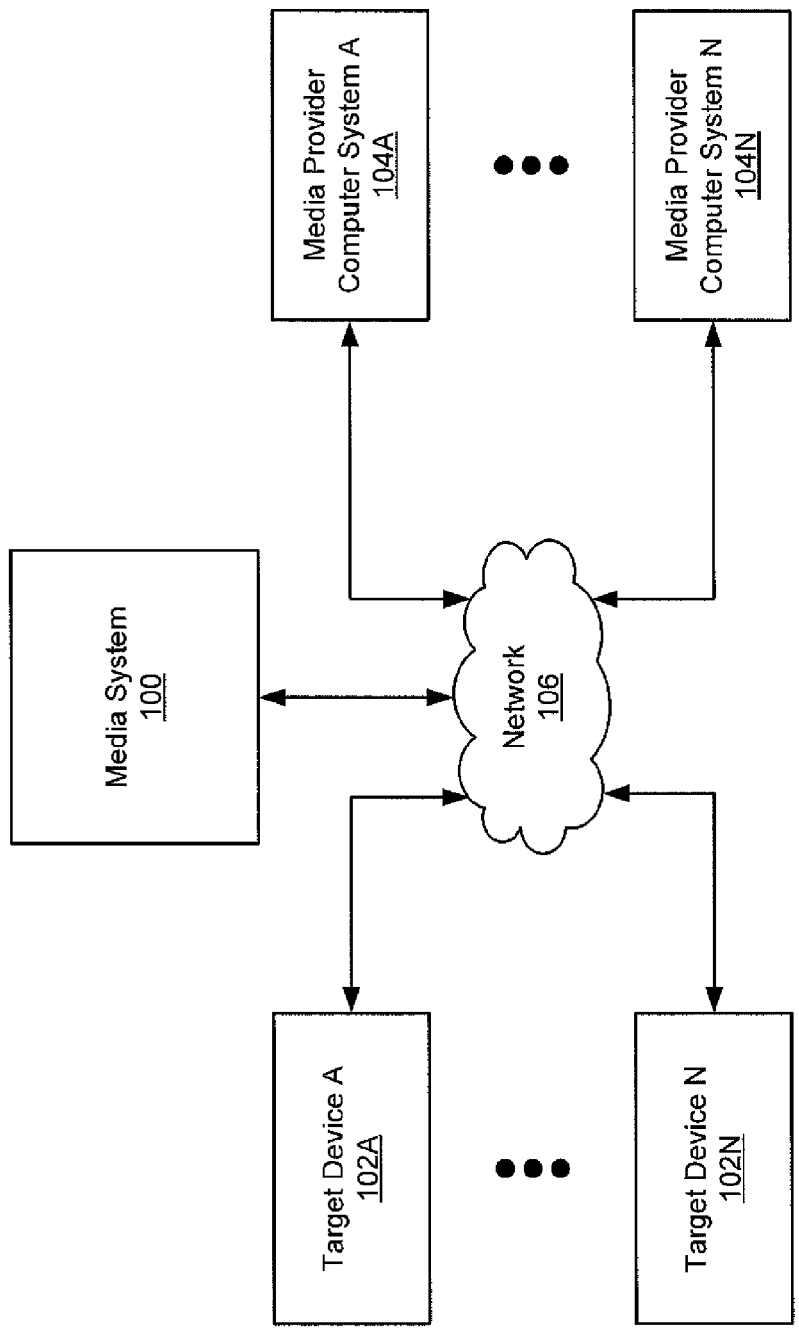
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide media items, such as images, to target devices. Specifically, embodiments of the invention may be used to aggregate feedback for a group of media items and provide a set of media items to target devices based on the aggregated feedback. Media items may include both advertiser-submitted media items and user-submitted media items. Aggregated feedback may include feedback units (e.g. votes) submitted by users of target devices, users who access the system by other means, or by entities purchasing the feedback units (e.g., for advertising purposes).

Further, embodiments of the invention may be implemented to automatically provide media items to a target device associated with a user based on that user's preferences and feedback received from that user, as well as the feedback from other users of the system. Media items, such as images, may be presented as a component of the user interface of the target device, such as the lock screen or background wallpaper. Media items may also be changed, and new media items presented, without any explicit action by the user of the target device. For example, in one or more embodiments of the invention, the lock screen or background wallpaper may change periodically without explicit action by the user.

FIG. 1 shows a diagram of a system in accordance with one or more embodiments of the invention. As shown in FIG. 1, the media system (100) communicates with multiple target devices (target device A (102A), target device N (102N)) and multiple media provider computer systems (media provider computer system A (104A), media provider computer system N (104N)) via a network (106).

In one or more embodiments of the invention, media system (100) is a combination of computer software and computer hardware configured to interact with target devices (target device A (102A), target device N (102N)) and media provider computer systems (media provider computer system A (104A), media provider computer system N (104N)).

In one or more embodiments of the invention, the target devices (target device A (102A), target device N (102N)) are computer systems configured to receive media items from the media system (100). In one embodiment of the invention, target devices (target device A (102A), target device N (102N)) are also configured to send information back to the media system (100), such as feedback units. A target device (target device A (102A), target device N (102N)) may be a desktop computer or a portable computing system such as a laptop computer, smartphone, tablet computer, or personal digital assistant. Each target device (target device A (102A), target device N (102N)) may also be implemented as a special purpose device, such as a television or other type of display device. Further, target devices (target device A (102A), target device N (102N)) may communicate with the media system differently depending upon the type of target device. Different types of target devices (target device A (102A), target device N (102N)) include, for example, devices utilizing the Android™ operating system (Android™ is a trademark of Google Inc.) and devices utilizing the IOS operating system (IOS is a trademark or registered trademark of Cisco in the U.S. and other countries and is used under license).

In one or more embodiments of the invention, the media provider computer systems (media provider computer system A (104A), media provider computer system N (104N)) are computer systems configured to provide media items to the media system (100). In one embodiment of the invention, a media provider computer system (media provider computer system A (104A), media provider computer system N (104N)) may also be configured to provide additional data to the media system (100), such as category information about a media item and a submitter identification (ID) associated with the media item. A media provider computer system (media provider computer system A (104A), media provider computer system N (104N)) may be a desktop computer or a portable computing system such as a laptop computer, smartphone, tablet computer, or personal digital assistant. Each media provider computer system (media provider computer system A (104A), media provider computer system N (104N)) may also be implemented as a special purpose device, such as a digital camera or other type of image capture device.

In one or more embodiments of the invention, a media provider computer system (media provider computer system A (104A), media provider computer system N (104N)) and a target device (target device A (102A), target device N (102N)) are implemented as a single device. In one embodiment of the invention, the combination device is capable of submitting media items to the media system (100) as well as receiving media items from the media system (100). Media provider computer systems (media provider computer system A (104A), media provider computer system N (104N)) may be operated by different kinds of media providers. Types of media providers may include, for example, members of a social community, advertisers, and photographers.

In one or more embodiments of the invention, the network (106) is a communication medium capable of transmitting data between the media system (100), the media provider computer systems (media provider computer system A (104A), media provider computer system N (104N)), and the target devices (target device A (102A), target device N (102N)). The network (106) may be any type of wired or wireless network or any combination thereof. Examples of networks include a telecommunications network and a wide area network.

Figure 2:
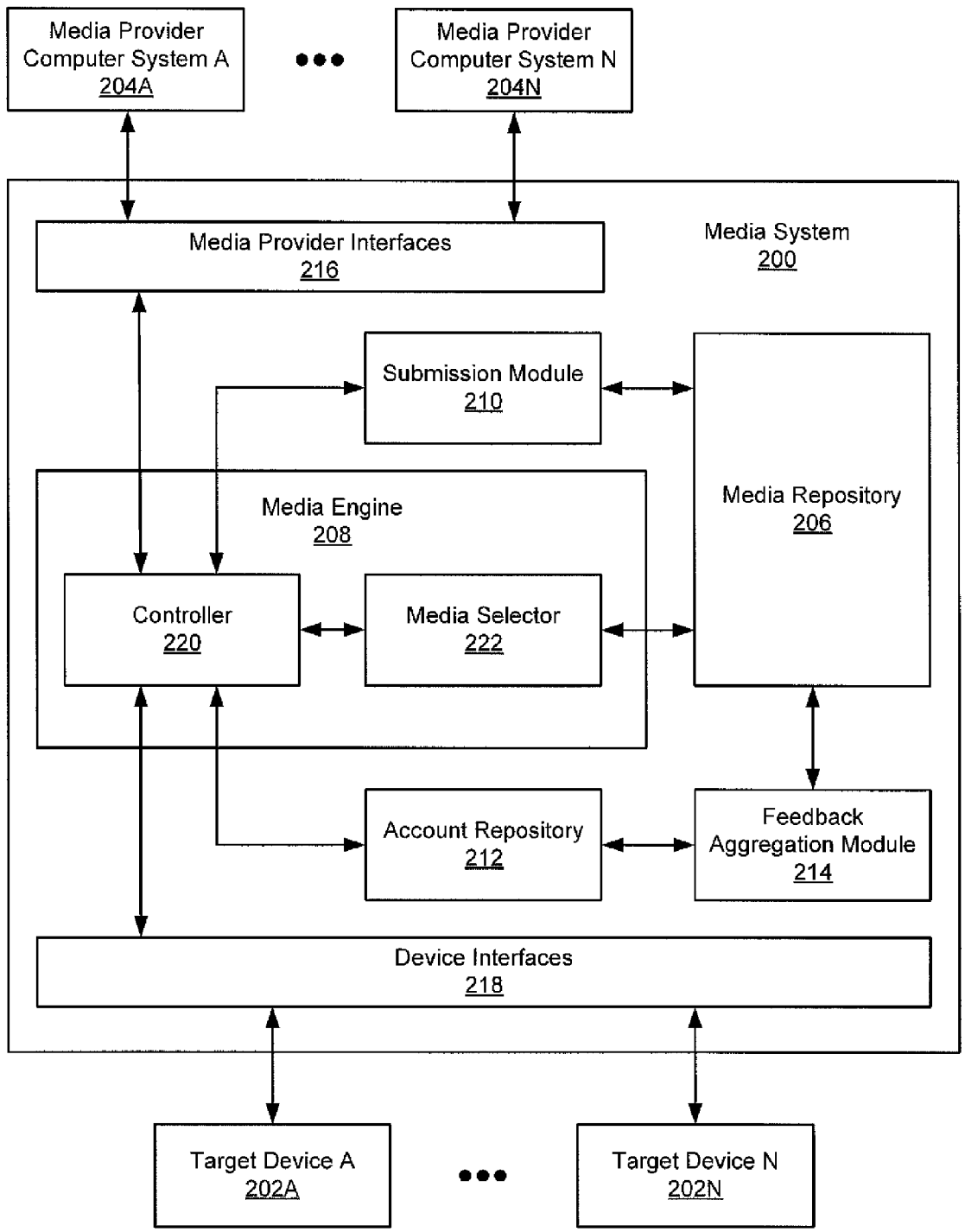
FIG. 2 shows a system in accordance with one or more embodiments of the invention.

FIG. 2 shows a diagram of a system in accordance with one or more embodiments of the invention. As shown in FIG. 2, a media system (200) may be connected to multiple target devices (target device A (202A), target device N (202N)) and multiple media provider computer systems (media provider computer system A (204A), media provider computer system N (204N)). In one embodiment of the invention, media system (200) includes a media repository (206), a media engine (208), a submission module (210), an account repository (212), a feedback aggregation module (214), media provider interfaces (216) and device interfaces (218). The media engine includes a controller (220) and a media selector (222). Each of the elements is described below.

In one or more embodiments of the invention, the media repository (206) is a repository of media objects. The media repository (206) may include a program or group of programs capable of receiving and interpreting a query requesting all media objects satisfy a set of criteria. The media repository (206) may further be configured to respond to a query by providing a media object or a group of media objects that satisfy the set of criteria, such as feedback criteria or category criteria. Further detail regarding the media repository (206) is provided in FIG. 3.

In one or more embodiments of the invention, the media engine (208) includes a controller (220) and a media selector (222). In one embodiment of the invention, the controller (220) includes functionality to respond to requests by target devices (target device A (202A), target device N (202N)), media provider computer systems (media provider computer system A (204A), media provider computer system N (204N)), and other elements within the media system (200). Such requests may include requests for a specific media object, or a media object or set of media objects that satisfy a set of criteria. Such requests may also include requests to create a media object, add a media object to the media repository (206), and/or modify an existing media object within the media repository (206).

In one or more embodiments of the invention, the controller (220) includes the functionality to initiate the transmission of a media object or group of media items based the transmission preferences in a user account. Specifically, the controller (220) may include the functionality determine whether a new media item from a media object should be transmitted to a target device, based on user transmission preferences, and/or to initiate the transfer of a media item to the target device. In one embodiment of the invention, the determination is made based on the status of a time interval specified in a user account. Specifically, a transfer may be initiated based on a determination that the current time interval has expired. Once the transmission is complete, the time interval may then be reset.

In one or more embodiments of the invention, the media selector (222) includes the functionality to determine which, if any, media objects satisfy a set of criteria. The media selector (222) may further be configured to compare media objects to determine a current ranking of a media object relative to one or more characteristics of the media objects (e.g., highest rate of positive feedback units). In one embodiment of the invention, the media selector (222) provides a media object or set of media objects to the controller (220). In one embodiment of the invention, the media selector (222) provides media objects to the controller by providing a media identifier (ID) or set of media IDs to the controller (222)

In one or more embodiments of the invention, the account repository (212) is a collection of user accounts associated with users of target devices (target device A (202A), target device N (202N)) and/or a media provider computer system (media provider computer system A (204A), media provider computer system N (204N)). The account repository (212) may be configured to respond to queries from other elements on the media system (200), such as the controller (220). Further detail regarding the account repository (212) is provided in FIG. 4.

In one or more embodiments of the invention, the feedback aggregation module (214) is configured to modify media objects in the media repository (206) based on feedback units received from target devices and stored in a user account within the account repository (212). In one embodiment of the invention, media items are presented on target devices with a mechanism (e.g., feedback input module) to obtain feedback units from a user of the target device. A user may activate an element within the feedback input module to generate a feedback unit associated with the presented media item. In one embodiment of the invention, a feedback unit is a unit a data generated in response to a user of a target device (target device A (202A), target device N (202N)) responding to a media item via a feedback input module. The generated feedback unit is then sent to the media system, and stored in the user account.

In one embodiment of the invention, the feedback aggregation module (214) interacts with the account repository to obtain feedback units received from target devices (target device A (202A), target device N (202N)) and modify the feedback metadata of the associated media object to include the feedback units.

In one or more embodiments of the invention, the device interfaces (218) include functionality to communicate with one or more target devices (target device A (202A), target device N (202N)). In one or more embodiments of the invention, the media provider interfaces (216) include the functionality to interact with media provider computer systems (media provider computer system A (204A), media provider computer system N (204N)). The interfaces (device interfaces (218), media provider interfaces (216)) may include a number of different interfaces for communication between the media system (200) and different types of target devices and media provider computer systems. Such interfaces may include, for example, networking protocol interfaces, short-range communication interfaces, and wireless computer communication interfaces. Such interfaces may also include human readable interfaces, such as a webpage guiding the user of a media provider computer system (media provider computer system A (204A), media provider computer system N (204N) to submit a media item to the media system (200).

In one or more embodiments of the invention, a media provider computer system (media provider computer system A (204A), media provider computer system N (204N)) may include functionality to submit requests to purchase or add feedback units to one or more media objects stored on the media system (100). In one embodiment of the invention, a feedback purchase request includes a media ID of the target media object and the requested number of feedback units. In one embodiment of the invention, the functionality to submit a feedback purchase request is in addition to—or instead of—the functionality to submit media items to the media system (200). In one embodiment of the invention, the cost of feedback purchases increases exponentially or linearly with the amount of feedback units requested for purchase. In one embodiment of the invention, the cost of feedback purchases decreases exponentially or linearly with the amount of feedback units requested for purchase.

In one or more embodiments of the invention, the submission module (210) includes the functionality to interact with the controller (220) to generate media objects and store media objects in the media repository (206). In one embodiment of the invention, the submission module further includes functionality to modify media objects stored in the media repository (206). Specifically, the submission module may include functionality to modify the feedback metadata to include feedback units purchased by a media provider computer system or other user or entity accessing the system (e.g., for advertising purposes). In one embodiment of the invention, the submission module may include functionality to designate a media item as advertiser-submitted, user-submitted, or other appropriate designation. Such designations may be based on the identity associated with the media submitter computer system. Data regarding the designation of a media item (e.g., advertiser-submitted, user-submitted) may be stored in the category metadata of a media object.

In one or more embodiments of the invention, a single device or computer system may include the functionality of a target device (target device A (202A), target device N (202N)), and a media provider computer system (media provider computer system A (204A), media provider computer system N (204N)). Further, the device interfaces (218) and media provider interfaces (216) may be implemented as a single interface or set of interfaces to interact with such a system.

Figure 3:
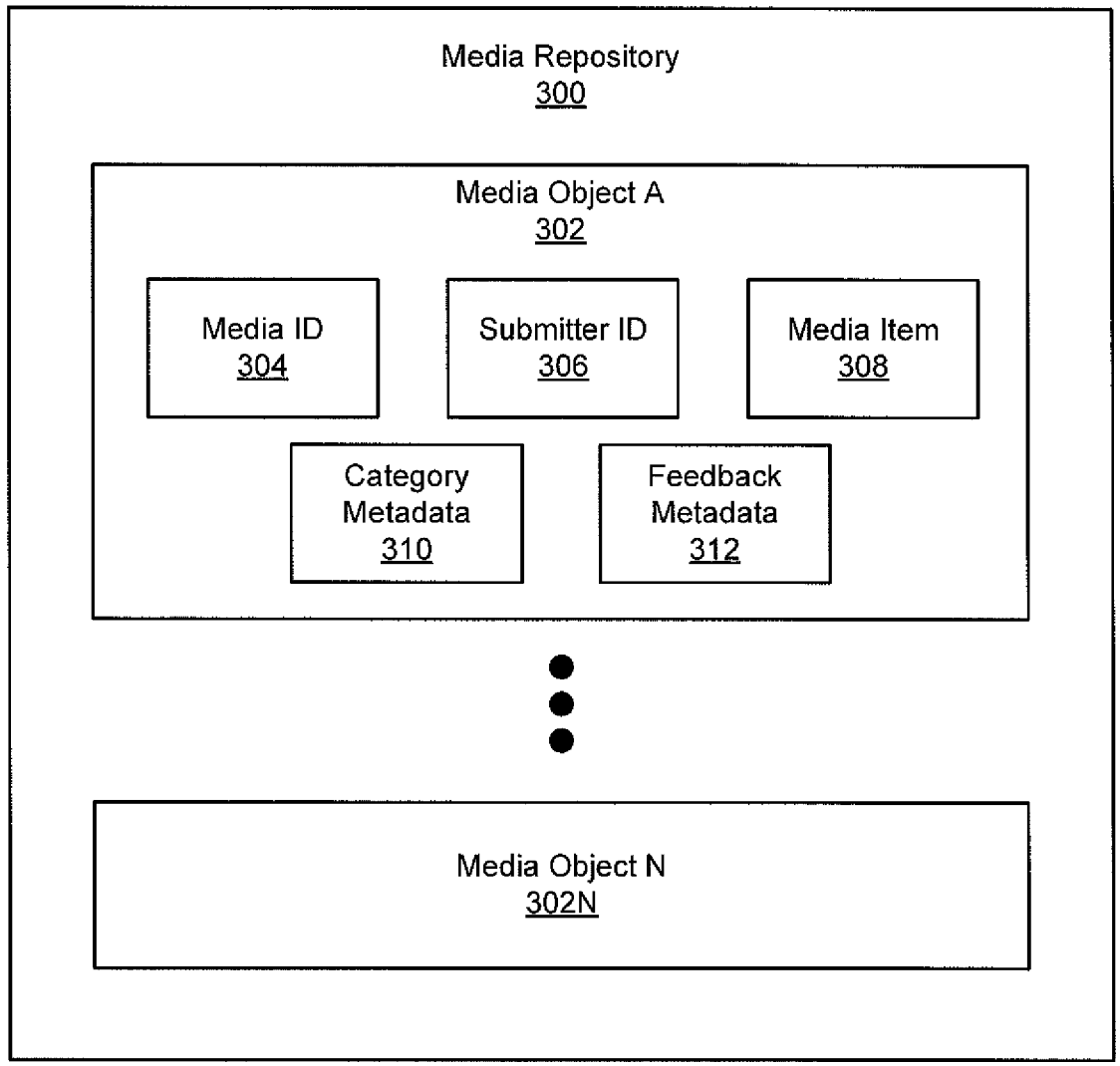
FIG. 3 shows a media repository in accordance with one or more embodiments of the invention.

FIG. 3 shows a media repository in accordance with one or more embodiments of the invention. The media repository shown in FIG. 3 provides further detail regarding the media repository in FIG. 2 (element 206 in FIG. 2). As shown in FIG. 3, the media repository includes multiple media objects (media object A (302A), media object N (302N)). Each media object (media object A (302A), media object N (302N)) includes a media object identifier (ID) (304), a submitter identifier (ID) (306), a media item (308), category metadata (310), and feedback metadata (312). Each of these components is described below.

In one or more embodiments of the invention, the media object identifier (ID) (304) is information or data used to distinguish one media object from another. A media object ID (304) may be a string of characters generated at the time the media object is created. Alternatively, a media object ID (304) may be derived from other elements in the media object, such as the result of applying a hash function to a media item (308) or a portion thereof. In one embodiment of the invention, the media repository is indexed using the media object ID (304).

In one or more embodiments of the invention, the submitter identifier (ID) (306) is information or data used to distinguish one user from another. In one or more embodiments of the invention, the submitter ID (306) is used to associate a media object (302) with a media provider and/or a user account. The submitter ID (306) may be a human readable text string created by the submitter of the media (i.e., a user handle). Alternatively, the submitter ID (306) may be text or data generated by the media system and assigned to a submitter. The submitter ID (306) may also be an externally verified communication address, such as an email address, of the submitter.

In one or more embodiments of the invention, the media item (308) is data used to render images, text, audio, video, or other media on a target device. A media item (308) may include multiple versions of a single media file and/or a combination of media files, such as an image file and a text file. A media item (308) may further include instructions for displaying or rendering the media file or combination of media files. For example, a media item (308) may include an inspiring historical quote and instructions (interpretable by the target device) that the quote be displayed in fourteen point "comic sans" font. In one embodiment of the invention, a media item (308) may include multiple instruction sets for different types of target devices. In one embodiment of the invention, the media item (308) is an advertisement. Examples of advertisements include audio commercials, video commercials, video demonstrations, images, and digital coupons.

In one or more embodiments of the invention, the category metadata (310) is data describing one or more elements of the media item. The data may include multiple terms describing different characteristics of the media item at varying levels of abstraction. In one embodiment of the invention, category metadata (310) for an image may include terms describing the item or items that are the focus of the image, terms describing the type of items depicted, terms describing the colors in the image, and terms describing the image itself For example, category metadata (310) for a media item that is a photograph of a sports car may include "car," "automobile," "red," "sunset," "Nissan," "photography," "dramatic," and "inspiring." As another example, category metadata (310) for a media item that is a drawing of a unicorn may include "unicorn," "fantasy," "waterfall," "sparkle," "illustration," "drawing," and "imaginary."

In one or more embodiments of the invention, the category metadata (310) may further indicate a relationship to time data (i.e., a specific time of day). For example, a media object (300) for an image that includes a scripture verse may include category metadata indicating that the scripture verse relates to a day of the week, a day of the year, or a specific time (e.g., verse John 3:16 relates to the times 3:16 AM and 3:16 PM). In one or more embodiments of the invention, the category metadata (310) may further indicate a relationship to location data. Specifically category metadata (310) may include terms indicating a region, country, city, or neighborhood. Category metadata (310) may also include generic location data relationships. For example, a media object (300) for an image of clouds may include category metadata (310) indicating a relationship to airplanes or airports.

In one or more embodiments of the invention, the category metadata (310) includes data describing other aspects of the media object. In one embodiment of the invention, category metadata (310) includes a timestamp indicated the time the media object was created and/or submitted. Category metadata (310) may similarly include an indication of how long a media object has been in the media repository. Further, in one embodiment of the invention, category metadata (310) also includes an indication distinguishing advertiser-submitted media items from non-advertiser-submitted media items (i.e., user-submitted media items). Examples of user-submitted media items may include a photo of lake taken by an amateur photographer, an audio file recorded on a mobile device of a congress person speaking, or an original motto by the user. User-submitted media items may also include professional or copyrighted content submitted with the permission of the owner (e.g., a photograph taken by a news organization, an image of a painting by an artist, etc.). Advertiser-submitted media items may include media items submitted for advertising purposes and/or media object that include purchased feedback units. In one or more embodiments of the invention, a media object for a media item may include designations other than advertiser-submitted and user-submitted.

In one or more embodiments of the invention, the designation for a media object may change with different circumstances. For example, an amateur photograph of an athlete just after scoring a game-winning point may be designated as a user-submitted media item when first submitted. At some later point, a sports drink company may submit a feedback purchase request targeting the image because the photograph includes their drink in the athlete's hands. After the feedback purchase request, the media object for the photograph may then be designated as advertiser-submitted. Alternatively, the designation may only change according to a relationship between feedback units received from users and feedback units added as a result of the feedback purchase request (e.g., the point where over 50% of positive feedback units received for photograph were purchased triggers a redesignation from user-submitted media item to advertiser-submitted media item).

In one or more embodiments of the invention, the feedback metadata (312) is data derived from feedback units associated with the media ID (304) that has been received by the media system. In one embodiment of the invention, the feedback metadata (312) includes multiple metrics related to different measurements of the received feedback units. Feedback metadata (312) may include the total number of feedback units received associated with the media ID (304) and/or media object (302A), the number of positive feedback units received, and the number of negative feedback units received. Feedback metadata (312) may also include metrics derived from relationships between other metrics. For example, feedback metadata (312) may include a number derived from the difference between positive feedback units received and negative feedback units received.

In one or more embodiments of the invention, the feedback metadata (312) may include metrics that account for the passage of time. In one embodiment of the invention, feedback metadata (312) may include a measurement of the rate of positive feedback units received and the rate of negative feedback units received. Alternatively, metrics measuring the number of positive feedback units received and the number of negative feedback units received may be altered or depreciated at regular intervals (e.g., after a predetermined time has elapsed) (see FIG. 9).

In one or more embodiments of the invention, the feedback metadata (312) may include both purchased feedback units and non-purchased feedback units. In one embodiment of the invention, a purchased feedback unit is a feedback unit added to feedback metadata in response to a feedback purchase request. A non-purchased feedback unit is a feedback unit added to feedback metadata without being initiated by a feedback purchase request (i.e., a user-submitted feedback unit).

Figure 4:
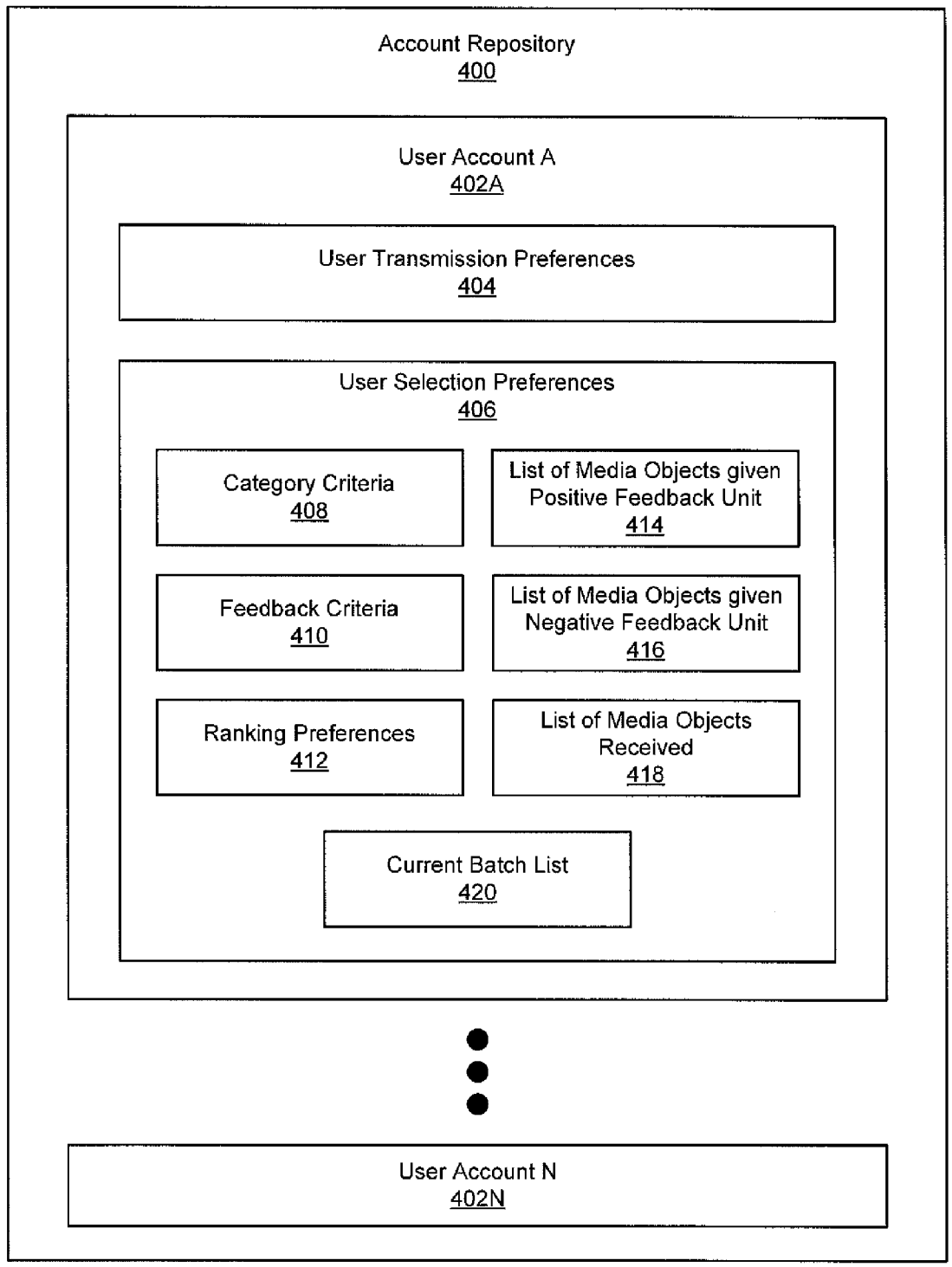
FIG. 4 shows a system in accordance with one or more embodiments of the invention.

FIG. 4 shows an account repository in accordance with one or more embodiments of the invention. The account repository shown in FIG. 4 provides further detail regarding the account repository in FIG. 2 (element 212 in FIG. 2). As shown in FIG. 4, the account repository (400) includes multiple user accounts (user account A (402A), user account N (402N)). Each user account (user account A (402A), user account N (402N)) includes user transmission preferences (404) and user selection preferences (406).

In one or more embodiments of the invention, the user transmission preferences (404) include settings indicating how media items are to be sent to a target device. Specifically, user transmission preferences (404) may include a device ID of the target device, and rotation settings. In one embodiment of the invention, rotating a media item refers to changing the currently presented media item to another media item. Rotation settings may include a rotation frequency or time interval indicating how often images are to be rotated on the target device (i.e., the duration that each media item is to be presented on the device). In one embodiment of the invention, the time interval may be automatically set as once per minute.

In one or more embodiments of the invention, the user transmission preferences (404) also include indications of the size and type of batch list to be used to transmit media items to a target device. Specifically, media items may be sent to a target device using different methods. Such methods may include sending one media item at a time, according to the rotation frequency. Alternatively, a batch of media items may be transmitted together and stored on the target device to be displayed one at a time according to the rotation frequency. The user transmission preferences (404) may also include limitations on transmitting media items and/or batches of media items. Such limitations may include permitting transmission only under specified conditions of the target device, such as during a period when the target device is connected to the media system via a wifi network connection, or only while the target device has a battery charge greater than 30%. In one or more embodiments of the invention, the user transmission preferences (404) may also include instructions regarding the frequency with which the batch list of media items is refreshed.

In one embodiment of the invention, a batch list is a list of media IDs referencing a group of media objects that satisfy the user selection preferences. In one embodiment of the invention, the batch list is the filtered results of a query to the media repository, which may also be ordered and adjusted according to the user selection preferences. As the batch list (i.e. the filtered, ordered, and adjusted results of the query) changes with time, the user transmission preferences (404) may indicate how frequently the batch list is to be refreshed. In one embodiment of the invention, a batch list may include both advertiser-submitted media items and user-submitted media items.

In one or more embodiments of the invention, the user transmission preferences (404) may also dictate how many media items are transferred at a time. The user transmission preferences (404) may indicate that media items in the batch list are to be transmitted as needed (i.e., when the time interval expires and a new media item is to be presented). Alternatively, the user transmission preferences (404) may indicate that all media items in the batch list are to be transmitted at one time (e.g., for local storage on the target device and accessed as needed by the target device).

In one or more embodiments of the invention, the user selection preferences (406) may include category criteria (408), feedback criteria (410), ranking preferences (412), a list of media objects associated with a positive feedback unit submitted by the user (414), a list of media objects associated with a negative feedback unit submitted by the user (416), a list of media objects received by the target device (418), and the current batch list (420). In one embodiment of the invention, the user selection preferences (406) are used to select, filter, order, and adjust a group of media objects. Specifically, the user selection preferences (406) are used by the media engine to select (e.g., using the category criteria (408)), filter (e.g., using the list of media objects associated with a negative feedback unit submitted by the user (416)), order (e.g., using the feedback criteria (410)), and adjust (e.g., using the ranking preferences (412)) media objects from the media repository.

In one or more embodiments of the invention, the category criteria (408) may include terms selected by the user indicating the types of media items that should be presented on the target device. In one embodiment of the invention, the category criteria (408) are terms that match one or more terms in the category metadata of a media object or group of media objects. Such matching may be approximate and a match may be identified using synonymous or related terms.

In one embodiment of the invention, category criteria (408) may include dynamic terms. Specifically, category criteria (408) may include terms dependent on the circumstances in existence at the time the category criteria (408) is applied. For example, category criteria (408) may dictate that a selected media item is related to the current time or the current location of the target device. Such time and location category criteria (408) may be specific to a time (e.g., 3:16 PM) or a specific place (e.g., Houston, Tex.). Such time and location category criteria (408) may be for a general time (e.g., mid-afternoon) or a general location (e.g., a mall, a city, an airport). Further, location data may be attained from a location tracking device on the target device, or assumed from the state of the target device (e.g., in "airplane mode")

In one or more embodiments of the invention, category criteria (408) may include time-based directives limiting the media objects satisfying the category criteria (408) to those submitted and/or stored in the media repository at a certain time. Such time-based directives include media objects submitted in the current year, media objects submitted within the last two weeks, and media objects submitted on Fridays.

In one or more embodiments of the invention, category criteria (408) may also include directives limiting the media objects satisfying the category criteria (408) to those submitted by a certain media submitter or type of media submitter. Such submitter-based directives include media objects submitted using a specific submitter ID, media objects submitted using submitter IDs associated with users with accounts created more than one year ago, and media objects submitted using submitter IDs associated with users in a specified geographic region.

In one or more embodiments of the invention, the feedback criteria (410) are data referencing a measurement of feedback units within a media object or group of media objects. In one embodiment of the invention, the feedback criteria (410) may indicate that a media item or group of media items matching the category criteria (408) should be selected over others matching the category criteria (408), according to the feedback metadata of the media object or media objects for the media items. Specifically, feedback criteria (408) dictates that media objects selected for the batch list should have feedback metadata that satisfies the metrics provided in the feedback criteria (408). Examples of feedback criteria (408) include most total amount of positive feedback units received, fewest total amount of negative feedback units received, and most recently received number of positive feedback units. Feedback criteria (408) may also reference measurements matching metrics maintained in the feedback metadata of media objects, such as the difference between positive feedback units received and negative feedback units received and the rate at which feedback units have been received.

In one or more embodiments of the invention, the ranking preferences (412) adjust an ordered acceptable set according to user selection preferences. In one embodiment of the invention, the ranking preferences (412) randomize the ordered acceptable set. In one embodiment of the invention, the ranking preferences (412) indicate that one media object or a group of media objects are to be selected for a batch list over other media objects based on the user's account history. Specifically, ranking preferences (412) may utilize information within the category criteria (408), feedback criteria (410), the list of media objects associated with a positive feedback unit submitted by the user (414), the list of media objects associated with a negative feedback unit submitted by the user (416), the list of media objects received by the target device (418), and the current batch list (420) to increase or decrease the likelihood that a media object will be selected for a batch list. Examples of ranking preferences (412) include lowering the rank of media items presented on the target display within the last five hours, increasing the rank of media items that have never been presented on the target display, and lowering the rank of media items associated with a submitter ID that matches the submitter ID of a media object in the list of media objects associated with a negative feedback unit submitted by the user (416).

In one or more embodiments of the invention, the list of media objects associated with a positive feedback unit submitted by the user (414) is a group of media IDs for media objects for which the user has submitted a positive feedback unit. Similarly, the list of media objects associated with a negative feedback unit submitted by the user (416) is a group of media IDs for media objects for which the user has submitted a negative feedback unit.

In one or more embodiments of the invention, the list of media objects received by the target device (418) is a group of media IDs for every media object associated with a media item that has been presented on a target device or group of target devices associated with a user account. The list of media objects received by the target device (418) may include information about the time that the media item was presented, the duration that the media item was display (which would have been according to the user transmission preferences at the time the media item was presented), and which target device the media item was presented on, if more than one target device is or has been associated with the user account.

In one or more embodiments of the invention, the current batch list (420) is a group of media IDs of the media objects selected from the results returned by the media selector satisfying the category criteria (408), ordered by the feedback criteria (410), and adjusted by the ranking preferences (412). The current batch list (420) may include a reference to the media ID for the previously transmitted media item and/or a reference to the media ID for the media item to be transferred next.

Figure 5:
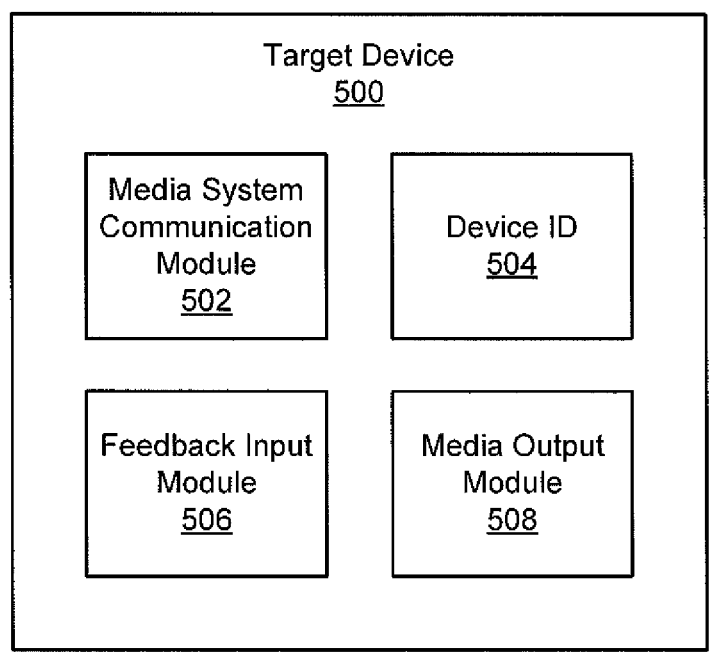
FIG. 5 shows a system in accordance with one or more embodiments of the invention.

FIG. 5 shows a target device in accordance with one or more embodiments of the invention. The target device shown in FIG. 5 provides further detail regarding the target devices in FIGS. 2 and 3 (elements 102A and 102N in FIG. 1, elements 202A and 202N in FIG. 2). As shown in FIG. 5, the target device (500) includes a media system communication module (502), a device identifier (ID) (504), a feedback input module (506), and media output module (508).

In one or more embodiments of the invention, the target device (500) may be implemented as any type of hardware capable of executing the media system communication module (502), feedback input module (506), and media output module (508).

In one or more embodiments of the invention, the media system communication module (502) is a process or group of processes capable of sending and receiving data to and from the media system. The media system communication module (502) may operate in conjunction with other software and hardware on the target device (500) and target device operating system (not shown) to send and receive data.

In one or more embodiments of the invention, the device identifier (ID) (504) is a unique code used to distinguish one device (500) from another. In one embodiment of the invention, a user account may be associated with more than one device, and each device may have different preferences associated with it. In such cases, the device ID (504) may be used to distinguish one device from another within the same user account. In one embodiment of the invention, the device ID (504) may be an address used to communicate with the device, such as a phone number, Internet Protocol (IP) address, or media access card (MAC) address. Alternatively, the device ID (504) may be an arbitrary string of text assigned to a device (500) when the target device (500) is added to a user account.

In one or more embodiments of the invention, the feedback input module (506) is a process or group of processes used to obtain feedback units from a user of the target device (500). In one embodiment of the invention, the feedback input module (506) includes a component that is presented along with the media item to the user. The feedback input module (506) may further include functionality to interpret input by the user as an indication to generate a feedback unit. For example, a feedback input module (506) operating in conjunction with a media item that is an image may operate by detecting gestures made on the touch-screen presenting the image (e.g., an upward swipe indicates a command to generate a positive feedback unit). A feedback input module (506) may be configured to receive input from sources other than those associated with the presentation device, such as an accelerometer. For example, a feedback input module (506) operating in conjunction with a media item that is an image may operate by detecting specific movements of the target device (e.g., shaking side-to-side).

In one or more embodiments of the invention, the media output module (508) is a process or group of processes configured to receive a media item from the media system (via the media system communication module (502)) and present that media item on the target device. The media output module (508) may be configured to determine a type of media item (such as an image, text, or audio file) and then present the media item on a corresponding element of the target device (500).

In one or more embodiments of the invention, the media output module (508) may be configured to present a media item as an element of the user interface of a target device. For example, media items may be presented as part of the lock screen of the device (i.e., screen content displayed initially when a device is activated, during periods of inactivity, or when a device is "locked"). In another example, media items may be presented as a background wallpaper of a target device (e.g., a background image displayed behind icons and/or application windows). In one embodiment of the invention, the media item presented (e.g., the image on a lock screen, background wallpaper) changes as new media items are received from the media system and/or rotated in. In one embodiment of the invention, the media output module is part of an application executing on the operating system of the target device. Alternatively, in one embodiment of the invention, the media output module is part of the operating system of the target device.

In one or more embodiments of the invention, a lock screen refers to the content of a display screen initially presented to a user when a device is activated from an inactive state. A lock screen may indicate or instruct that the user provide some form of authentication before the device may be used. Authentication may include providing evidence that the device was activated intentionally (e.g., by performing instructions provided on the screen), or evidence that the user is authorize to access the device (e.g., by providing a password, pin number, or gesture known only to an authorized user).

In one or more embodiments of the invention, the media output module (508) is configured to present a media item on a target device (500) not currently in use. Specifically, in one embodiment of the invention, media items are presented (e.g., an image on a lock screen) and changed regardless of whether the target device is in use. In such embodiments, the user of the target device will present the most recent update to a user as soon as that user begins using the device (instead of waiting until the device is in use before presenting a media item or rotating in a new media item). As one example, a target device that is a mobile phone may be placed on a bed-side table while the user sleeps. The mobile phone may continue to change the image on the lock screen using media items received from the media system during the night. If the display is active and the screen content viewable, the user may observe each new image presented on the lock screen. If the display is inactive, only a reference used by the lock screen for the image to be presented changes, and the currently presented image may only be visible once the display is active and the screen content viewable.

In one embodiment of the invention, the media output module (508) may be configured to limit the presentation of media items to periods specified by a user (e.g., for a target device that is battery-powered, during periods when the device is attached to an external power source).

Figure 6:
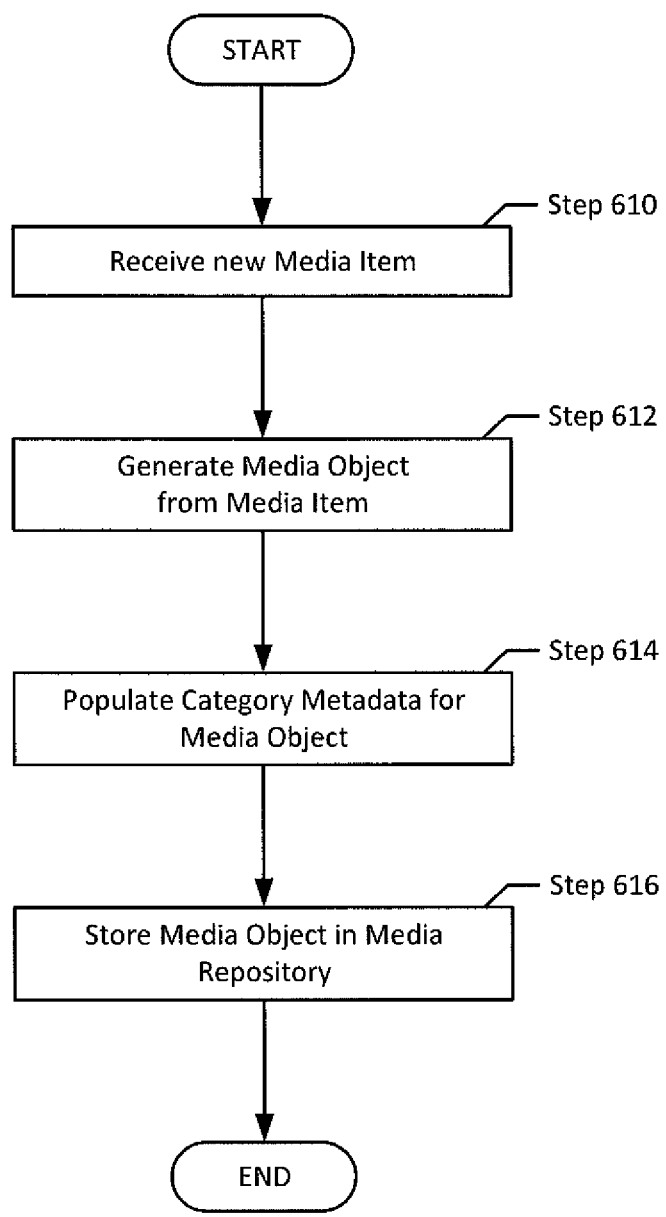
FIG. 6 shows a flow diagram in accordance with one or more embodiments of the invention.

FIG. 6 shows a flowchart for generating a media object in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the media engine receives a new media item from a media provider computer system via a media provider interface. In Step 612, the submission module generates a media object using the media item. In one embodiment of the invention, the media object is generated and the media item is added to the media object. Adding a media item to a media object may further include obtaining data about the media item and storing the data in the media object (e.g., media item size, file type, etc). In Step 614, the submission module populates the category metadata for the media object. In one embodiment of the invention, the media item is submitted with a description, and terms may be extracted from the description and included in the category criteria. In one embodiment of the invention, the media item is processed automatically by the media system to determine category metadata. In Step 616, the submission module stores the media object in the media repository.

Figure 7:
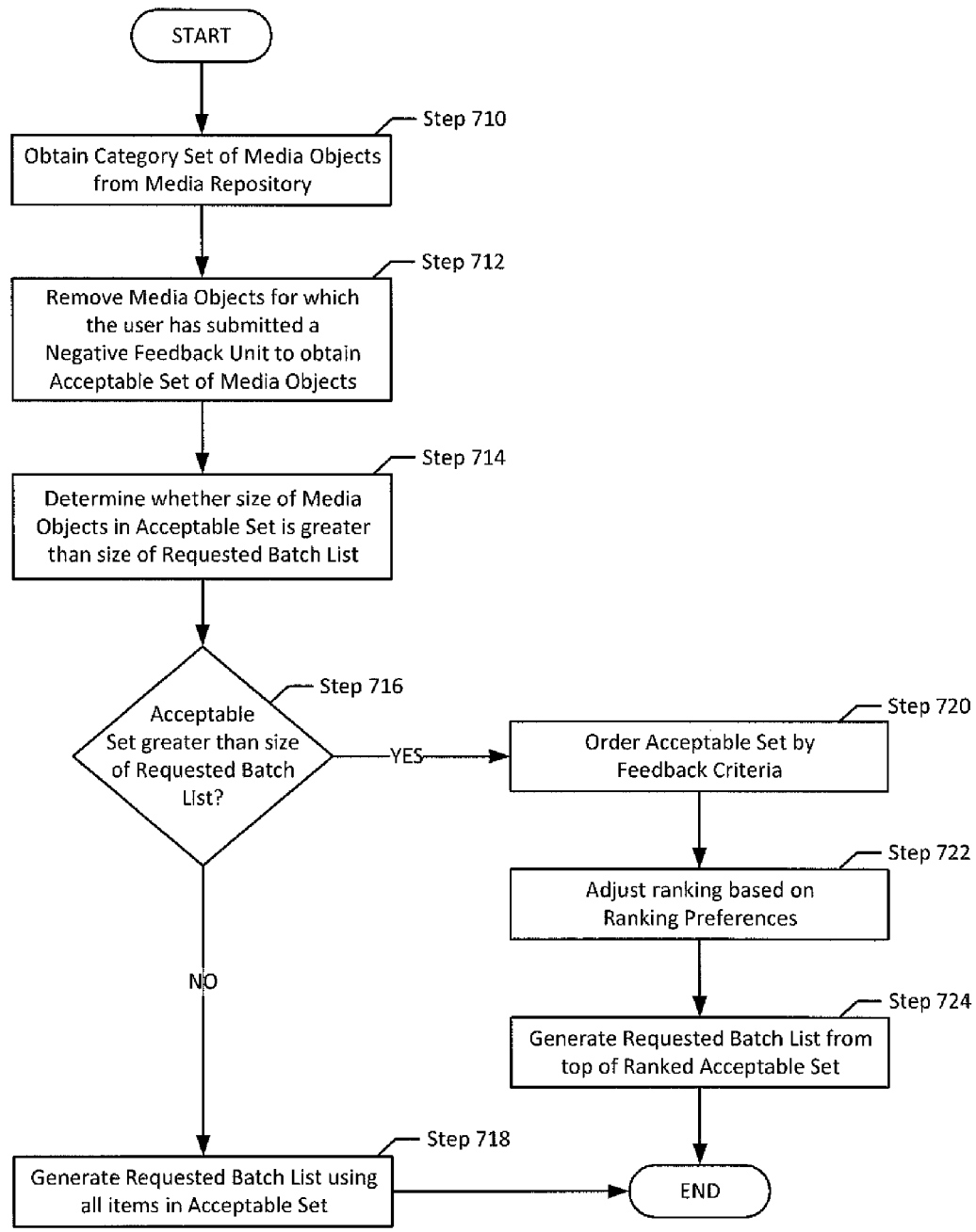
FIG. 7 shows a flow diagram in accordance with one or more embodiments of the invention.

FIG. 7 shows a flowchart for obtaining a batch list of media objects in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 710, the media engine obtains a set of media object from the media repository that matches the category criteria in the user selection preferences (i.e., the category set). In Step 712, the media IDs matching the media IDs in the list of media objects associated with a negative feedback unit submitted by the user are removed from the category set. The resulting group of media IDs is referred to as the acceptable set.

In Step 714, the size of the acceptable set is compared to the size of the requested batch list (obtained from the user transmission preferences). If in Step 716, the media engine determines that the size of the acceptable set is not greater than the size of the requested batch list, then in Step 718, the requested batch list is populated using all items in the acceptable set. In one embodiment of the invention, the size of an acceptable set is not greater than the requested batch list size if the current number of media objects in the media repository that satisfy the category metadata does not exceed the number of media objects requested. In this case, all acceptable media objects are added to the requested batch list. For example, a user account may initiate a request for a batch list of the top 100 highest rated car images in the media repository. If in this example, the media repository includes only 90 car images total, regardless of rating, then the media selector may respond with a batch list of all 90 car images.

If in Step 716, the media engine determines that the size of the acceptable set is greater than the size of the requested batch list, then in Step 720, the acceptable set is ordered according to the feedback criteria. In Step 722, the ordered acceptable list is adjusted according to the ranking preferences. In one embodiment of the invention, the ranking preferences may express a user preference by altering the rank of a media object within the ordered acceptable list. For example, a user's ranking preferences may indicate that media objects already received in a recent batch list be lowered in the ordered acceptable list, while media objects that have not yet been received by a target device associated with the user account are given an increased rank in the ordered acceptable list. As another example, a user's ranking preferences may indicate that an increased rank should be given to media items that share some measurable aesthetic similarity to media items for which the user has submitted a positive feedback unit. In Step 724, the requested batch list is generated using the top ranked media objects in the ranked acceptable list.

Figure 8:
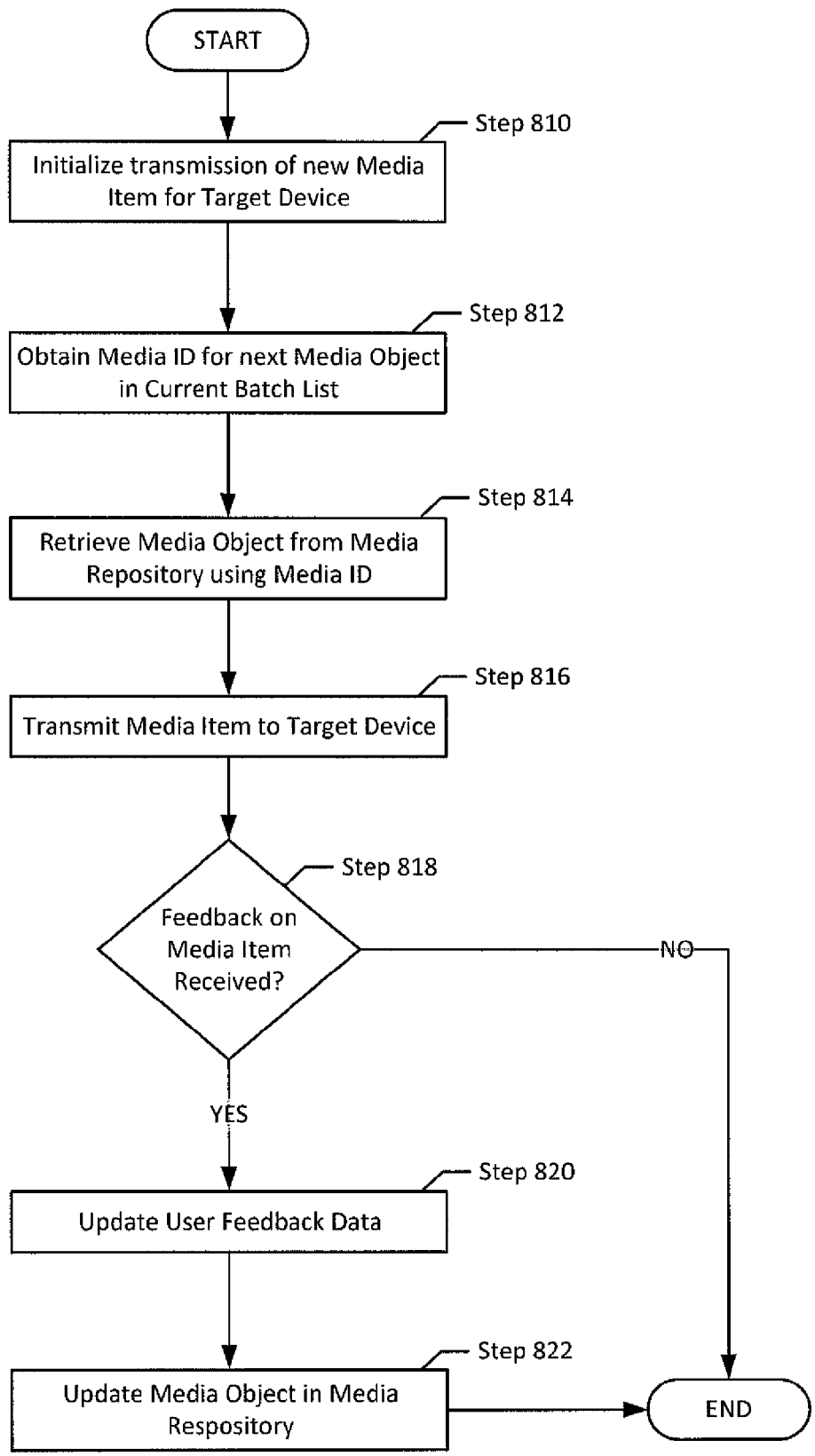
FIG. 8 shows a flow diagram in accordance with one or more embodiments of the invention.

FIG. 8 shows a flowchart for transmitting a media item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 810, the transmission of a new media item to a target device is initiated. In one embodiment of the invention, the transmission is initiated by a target device sending a media request for a new media item to the media system. In one embodiment of the invention, the transmission is initiated by a process within the media system. In one embodiment of the invention, the selection is initiated by the controller in response to a determination that a media item is to be sent to a target device according to the user transmission preferences associated with the target device. In one embodiment of the invention, the selection is initiated by the controller in response to a determination that a time interval in the user transmission preferences has expired. In one embodiment of the invention, in order to conserve bandwidth, the batch list is transmitted and stored on the target device. In such embodiments, the target device initiates the transfer by sending a media ID from the batch list to the media system.

In Step 812, the media engine obtains the media ID for the next media item in the current batch list. In Step 814, the media engine retrieves a media object from the media repository matching the obtained media ID. In Step 816, the media item is extracted from the media object and transmitted to the target device.

In Step 818, the media engine determines whether a feedback unit has been received from the target device. If in Step 818, a feedback unit is received, then in Step 820, the feedback unit is added to the user account and in Step 820, the feedback unit is used to update the media object of the media item sent to the target device.

Figure 9A:
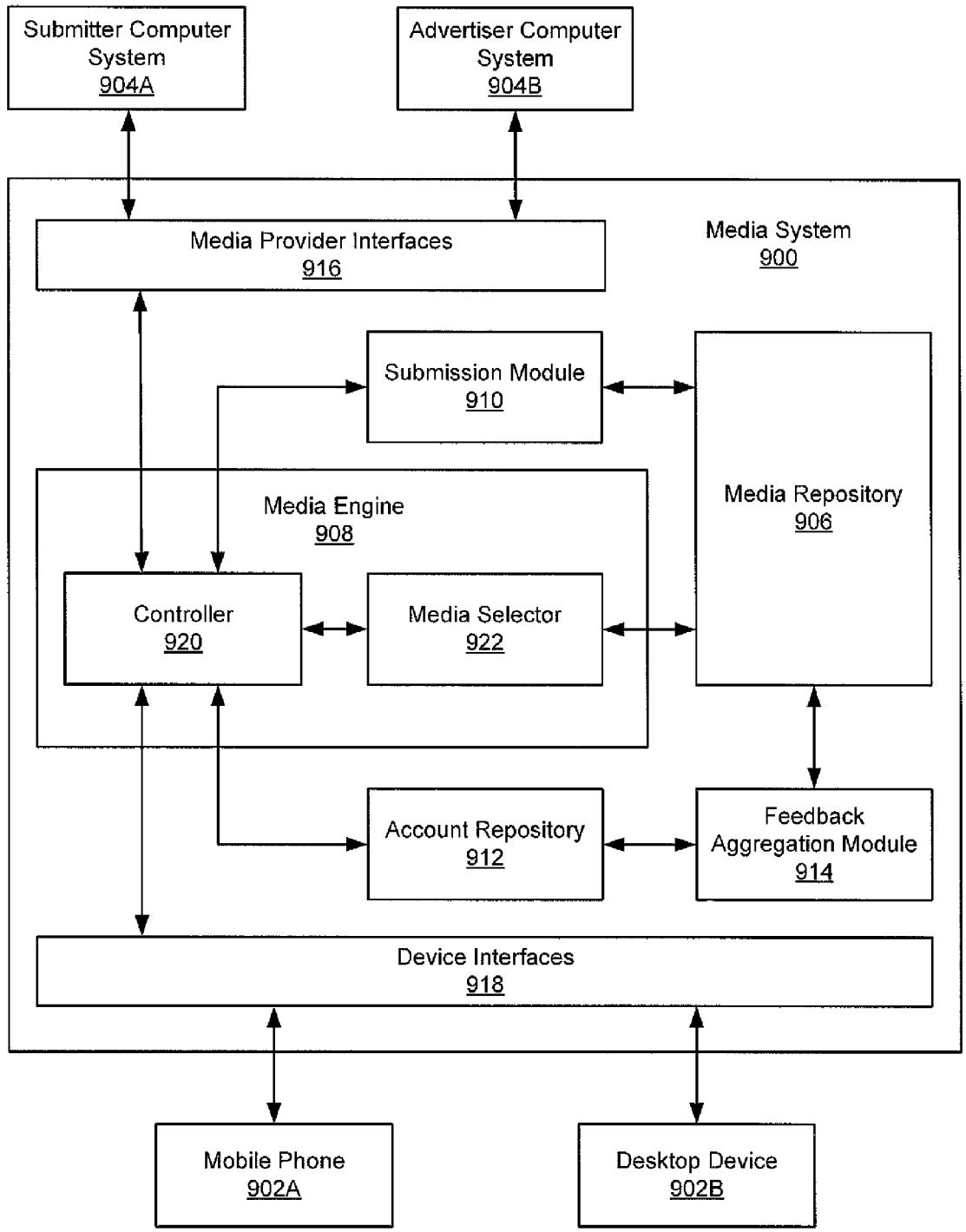
FIGS. 9A-9D show an example in accordance with one or more embodiments of the invention.

FIG. 9A shows an example system in accordance with one or more embodiments of the invention. As shown in FIG. 9, a media system (900) is connected to two target devices (mobile phone (902A) and desktop computer (902B)) and two media provider computer systems (submitter computer system (904A) and advertiser computer system (904B)). The media system (900) includes a media repository (906), a media engine (908), a submission module (910), an account repository (912), a feedback aggregation module (914), media provider interfaces (916) and device interfaces (918). The media engine includes a controller (920) and a media selector (922).

Figure 9B:
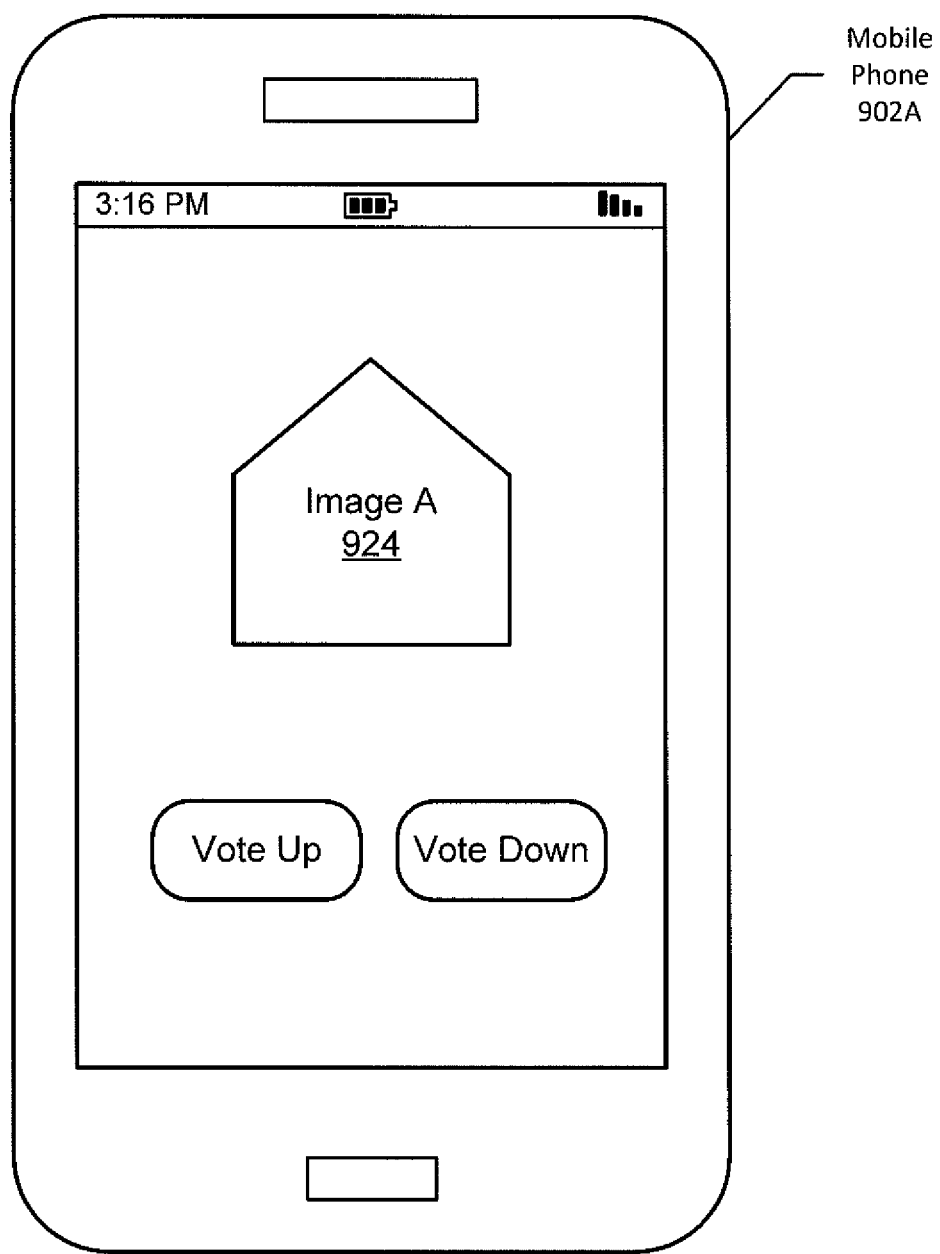

FIG. 9B shows an example target device in accordance with one or more embodiments of the invention. As shown in FIG. 9B, the target device is a mobile phone (902A) presenting image A (924). The mobile phone (902A) also includes a presentation used to initiate the generation of a feedback unit (i.e., the "vote up" and "vote down" buttons).

Figure 9C:

FIG. 9C shows an example table in accordance with one or more embodiments of the invention. As shown in FIG. 9C, four media objects (A, B, C, and D) are each associated with a feedback metric stored in the feedback metadata of each media object. For the purposes of this example, the feedback metric (FBM) displayed in the table represents the number of positive feedback units received minus the number of negative feedback units received. Further, for the purposes of the example, assume that the number of negative feedback units received is increased by 1 at every increment of time to depreciate the positive feedback units over time. As shown in FIG. 9C, at time t=0, media object A has a FBM of 7, media object B has a FBM of 9, media object C has a FBM of 5, and media object D has not been created and has no FBM associated with it.

For the purposes of the example, assume that mobile phone (902A) and desktop computer (902B) are each associated with different user account (not shown), and both user accounts include transmission preferences indicating that a media item from the current batch list should be sent at every increment of t. Assume also that the user selection preferences for the mobile phone (902A) user account are configured to send one of the top four photographs of Japan based on highest FBM. Specifically, the user account for the mobile phone (902A) is configured to include category criteria with the terms "photograph" and "Japan," feedback criteria ordering the list by highest FBM of the acceptable set at every increment of t, and ranking preferences that prevent the previous two media images from being selected.

For the purposes of the example, assume also that the user selection preferences for the desktop computer (902B) user account are configured to send photographs of Japan with a FBM of at least 5. Specifically, the user account for the desktop computer (902B) is configured to include category criteria with the terms "photograph" and "Japan," feedback criteria filtering out media items with a FBM of less than 5, and ranking preferences that randomize the ordered acceptable set, and that the batch is refreshed at every increment of t (i.e., a batch list with a single media ID, refreshed at every increment of t).

Further, for the purposes of this example, assume that media item A, media item B, media item C, and media item D are each photographs of Japan, and each include category metadata matching the category preferences in the user accounts associated with mobile phone (902A) and desktop computer (902B). Finally, assume that media item A was the first media object submitted of the set and that media item C was the most recent media object submitted.

Figure 9D:
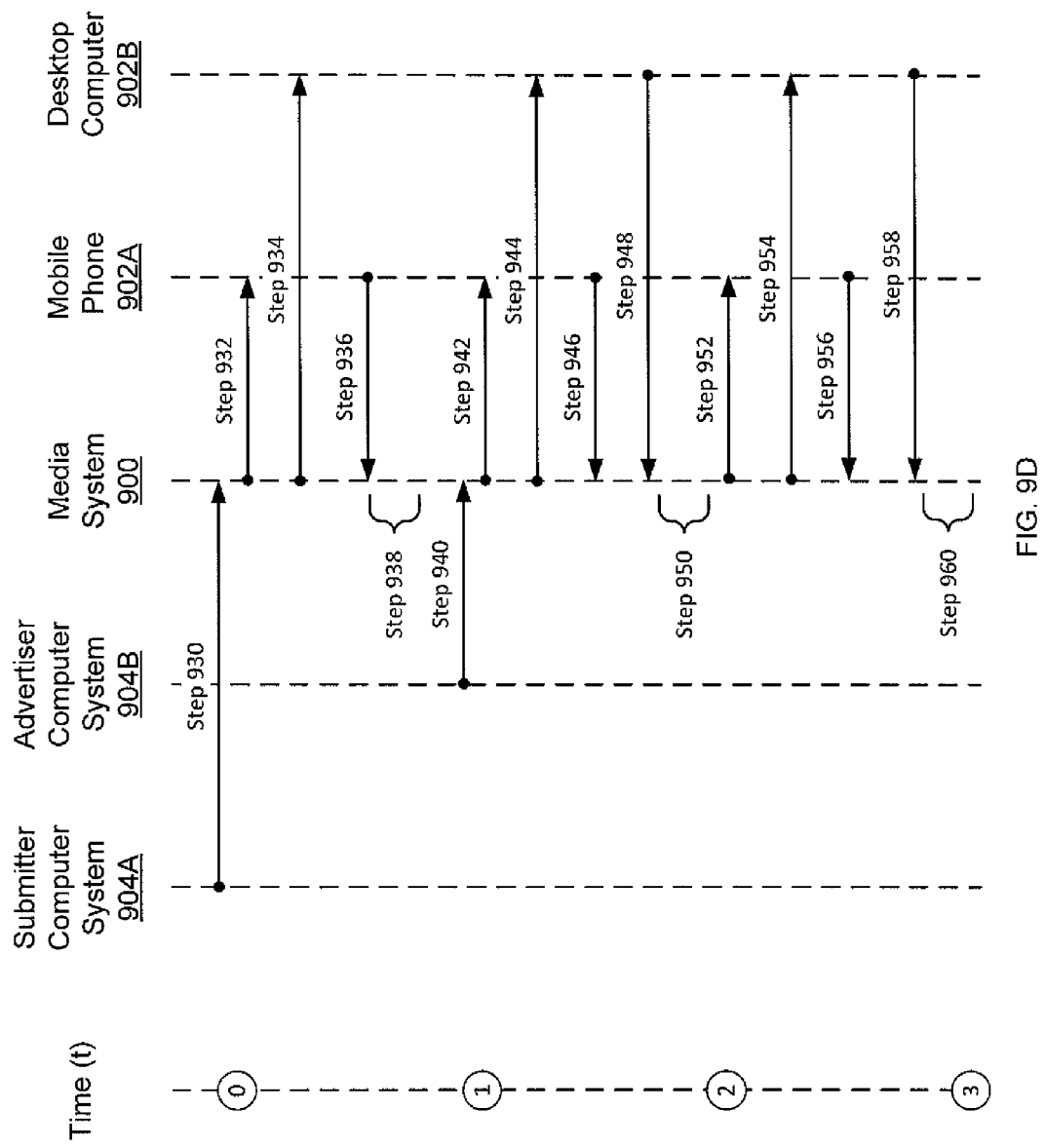

FIG. 9D shows an example timeline in accordance with one or more embodiments of the invention. At Step 930, at some point prior to t=0, submitter computer system (904A) submits media item C to the media system (900), and the media system (900) generates media object C and stores media object C in the media repository (906). Also, at some point prior to t=0, media object C attains a FBM of 5.

At Step 932, the media system (900) selects and transfers media item B to the mobile phone (902A). Specifically, the media system (900) first selects all media objects that match the category criteria for the mobile phone (902A) (media item A, media item B, and media item C), and selects the media object with the highest FBM (media object B) that was not one of the last two media item sent.

At Step 934, the media system (900) selects and transfers media item C to desktop computer (902B). Specifically, the media system (900) first selects all media objects that match the category criteria for the desktop computer (902B) (media item A, media item B, and media item C), filters out media objects with an FBM of less than 5 (all are above 5), and selects one of the remaining media objects at random (media object C).

At Step 936, media system (900) receives a positive feedback unit from mobile phone (902A) for media item B. At Step 938, the media system (900) adds the feedback unit to media object B. At Step 940, the media system (900) receives media item D (an image advertising tours of Japan) from advertiser computer system (904B) with a request to purchase an FBM of 6. The FBM for each media object at time t=1 is reflected in FIG. 9C, including the depreciation.

At Step 942, the media system (900) selects and transfers media item A to the mobile phone (902A). Specifically, the media system (900) first selects all media objects that match the category criteria for the mobile phone (902A) (media item A, media item B, media item C, and media item D), and selects the media object with the highest FBM (media object A) that was not one of the last two media item sent.

At Step 944, the media system (900) selects and transfers media item D to desktop computer (902B). Specifically, the media system (900) first selects all media objects that match the category criteria for the desktop computer (902B) (media item A, media item B, media item C, and media item D), filters out media objects with an FBM of less than 5 (media object C is removed), and selects one of the remaining media objects at random (media object D).

At Step 946, media system (900) receives a negative feedback unit from mobile phone (902A) for media item A. Specifically, the media system (900) first selects all media objects that match the category criteria for the desktop computer (902B) (media item A, media item B, and media item C), filters out media objects with an FBM of less than 5 (all are above 5), and selects one of the remaining media objects at random (media object C).

At Step 948, media system (900) receives a negative feedback unit from desktop computer (902B) for media item D. At Step 950, the media system (900) adds the feedback units to media object A and media object D. The FBM for each media object at time t=2 is reflected in FIG. 9C, including the depreciation.

At Step 952, the media system (900) selects and transfers media item D to the mobile phone (902A). Specifically, the media system (900) first selects all media objects that match the category criteria for the mobile phone (902A) (media item A, media item B, media item C, and media item D), and selects the media object with the highest FBM (media object D) that was not one of the last two media item sent.

At Step 954, the media system (900) selects and transfers media item B to desktop computer (902B). Specifically, the media system (900) first selects all media objects that match the category criteria for the desktop computer (902B) (media item A, media item B, media item C, and media item D), filters out media objects with an FBM of less than 5 (media item A, media item C, and media item D are removed), and selects one of the remaining media objects at random (media object B).

At Step 956, media system (900) receives a negative feedback unit from mobile phone (902A) for media item D. At Step 958, media system (900) receives a positive feedback unit from desktop computer (902B) for media item B. At Step 960, the media system (900) adds the feedback units to media object B and media object D. The FBM for each media object at time t=3 is reflected in FIG. 9C, including the depreciation.

Figure 10:
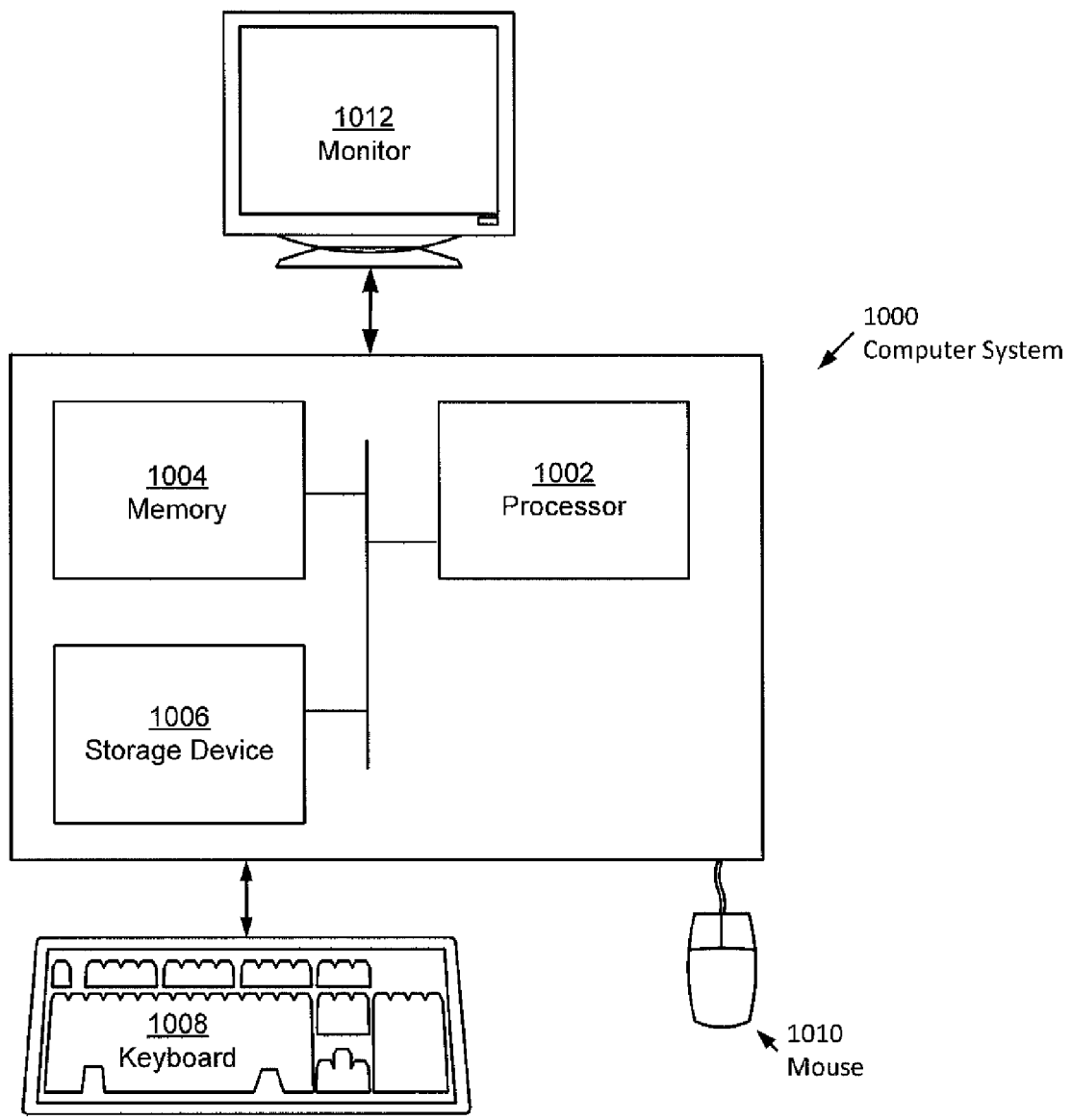
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002) such as a central processing unit (CPU) or other hardware processor(s), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1002) is hardware. For example, the processor may be an integrated circuit. The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable media comprising instructions that, when executed by a processor, perform a method for servicing requests for media, the method comprising:
   receiving a request from an advertiser to purchase feedback units for an advertisement, wherein advertisement is obtained from the advertiser;
   in response to receiving the request from the advertiser:
      obtaining a first media object comprising the advertisement, a submitter ID associated with the media object, a media ID identifying the first media object, first category metadata, and first feedback metadata, wherein the first feedback metadata comprises non-purchased feedback units; and
      obtaining a modified first feedback metadata by updating the first feedback metadata to include the purchased feedback units;
   receiving a first media request associated with a first target device;
   obtaining a first user account associated with the first media request, wherein the first user account comprises first user category criteria;
   identifying the first media object and a second media object, wherein the first media object and the second media object satisfy the first user category criteria and wherein the second media object comprises user-submitted content;
   selecting the first media object based on a determination that the first media object is ranked higher than the second media object, wherein a ranking of the first media object is based on the modified first feedback metadata and a ranking of the second media object is based on second feedback metadata, and wherein the modified first feedback metadata is greater than the second feedback metadata;
   sending, in response to the selecting, the advertisement to the first target device, wherein the advertisement is presented on a lock screen of the first target device.

2. The non-transitory computer readable medium of claim 1, further comprising:
   receiving, from the first target device, a first non-purchased feedback unit associated with the advertisement; and
   obtaining updated first feedback metadata by updating the modified first feedback metadata to include the first feedback unit.

3. The non-transitory computer readable medium of claim 2, further comprising:
   receiving a second media request associated with a second target device;
   obtaining a second user account associated with the second media request, wherein the second user account comprises second user category criteria;
   identifying the first media object and the second media object, wherein the second media object further comprises second category metadata, wherein the first category metadata and the second category metadata satisfy the second user category criteria;
   selecting the first media object based on a comparison of the updated first feedback metadata and the second feedback metadata;
   sending, to the second target device, the advertisement based on the selection of the first media object, wherein the advertisement is presented on a lock screen of the second target device;
   receiving, from the second target device, a second feedback unit associated with the advertisement; and
   obtaining twice updated first feedback metadata by modifying the updated first feedback metadata to include the second feedback unit.

4. The non-transitory computer readable medium of claim 3, wherein the first feedback unit is a negative feedback unit.

5. The non-transitory computer readable medium of claim 1, wherein the second feedback metadata is depreciated after a predetermined period of time has elapsed.

6. The non-transitory computer readable medium of claim 1, wherein the second feedback metadata comprises a purchased feedback unit and a non-purchased feedback unit.

7. The non-transitory computer readable medium of claim 1, wherein the advertisement is an image.

8. The non-transitory computer readable medium of claim 3, wherein selecting the first media object based on the comparison of the updated first feedback metadata and the second feedback metadata comprises:
   determining that a rate at which positive feedback units are received for the first media object is greater than a rate at which positive feedback units are received for the second media object.

9. The non-transitory computer readable medium of claim 1,
   wherein the first user account further comprises a time interval, and
   wherein sending, to the first target device, the advertisement comprises determining that the time interval has expired.

10. The non-transitory computer readable medium of claim 1, wherein the first target device is a mobile phone.

11. The non-transitory computer readable medium of claim 1, wherein the first user account further comprises feedback criteria indicating that a media object with a highest amount of feedback units is to be selected.

12. The non-transitory computer readable medium of claim 1, further comprising:
   after an increment of time as passed, decrementing the modified first feedback metadata to obtain decremented modified feedback metadata;
   receiving a positive feedback unit for a second media item from a second target device, wherein the second media object comprises a second media item;
   updating the second feedback metadata with the positive feedback unit to obtain modified second feedback metadata;
   receiving a second media request associated with a second target device;
   obtaining a second user account associated with the second media request, wherein the second user account comprises second user category criteria;
   identifying the advertisement and the second media object, wherein the first advertisement and the second media object satisfy the second user category criteria;
   selecting the second media object based on a comparison of the decremented modified first feedback metadata and the modified second feedback metadata; and
   sending, to the second target device, the second media item, wherein the second media item is presented on the lock screen of the second target device.

\* \* \* \* \*